(12) United States Patent
Takaoka et al.

(10) Patent No.: US 11,578,473 B2
(45) Date of Patent: Feb. 14, 2023

(54) CONTROL SYSTEM FOR WORK VEHICLE, METHOD, AND WORK VEHICLE

(71) Applicant: KOMATSU LTD., Tokyo (JP)

(72) Inventors: Yukihisa Takaoka, Tokyo (JP); Kazuki Kure, Tokyo (JP)

(73) Assignee: KOMATSU LTD., Tokyo (JP)

( * ) Notice: Subject to any disclaimer, the term of this patent is extended or adjusted under 35 U.S.C. 154(b) by 436 days.

(21) Appl. No.: 16/636,930

(22) PCT Filed: Jan. 21, 2019

(86) PCT No.: PCT/JP2019/001674
§ 371 (c)(1),
(2) Date: Feb. 6, 2020

(87) PCT Pub. No.: WO2019/187532
PCT Pub. Date: Oct. 3, 2019

(65) Prior Publication Data
US 2020/0370277 A1    Nov. 26, 2020

(30) Foreign Application Priority Data

Mar. 29, 2018 (JP) .............................. JP2018-065143

(51) Int. Cl.
*E02F 9/20* (2006.01)

(52) U.S. Cl.
CPC .......... *E02F 9/2029* (2013.01); *E02F 9/2041* (2013.01); *E02F 9/2045* (2013.01)

(58) Field of Classification Search
CPC . E02F 9/262; E02F 9/205; E02F 3/844; E02F 3/841; E02F 3/842; E02F 3/845;
(Continued)

(56) References Cited

U.S. PATENT DOCUMENTS

| 4,820,041 A | * | 4/1989 | Davidson ................ E02F 3/842 |
| | | | 33/294 |
| 5,024,571 A | | 6/1991 | Shahar et al. |

(Continued)

FOREIGN PATENT DOCUMENTS

| JP | 2-221527 A | 9/1990 |
| JP | 2-266070 A | 10/1990 |

(Continued)

OTHER PUBLICATIONS

The International Search Report for the corresponding international application No. PCT/JP2019/001674, dated Mar. 19, 2019.

(Continued)

*Primary Examiner* — Edwin J Toledo-Duran
(74) *Attorney, Agent, or Firm* — Global IP Counselors, LLP

(57) ABSTRACT

At least a portion of a first target design topography is positioned below an actual topography. At least a portion of a second target design topography is positioned below the actual topography and is inclined with respect to the first target design topography. A controller generates a command signal to operate a work implement according to the first target design topography in an area where the first target design topography is positioned above the second target design topography. The controller generates a command signal to operate the work implement according to the second target design topography in an area where the second target design topography is positioned above the first target design topography.

20 Claims, 14 Drawing Sheets

(58) Field of Classification Search
CPC ....... E02F 3/847; E02F 9/2037; E02F 9/2041;
E02F 9/2045; E02F 3/7618; E02F 9/265;
E02F 3/84; E02F 9/20; E02F 3/7609;
E02F 3/76; E02F 9/2225; E02F 9/2296;
E02F 9/2235; E02F 9/2029; G06Q 50/08;
G05D 1/021; G05D 2201/0202; G05D
1/0212; G05D 1/0274; G05D 1/0094;
G05D 1/0278; G05D 1/02; E01C 19/004
See application file for complete search history.

(56) References Cited

U.S. PATENT DOCUMENTS

| | | | | |
|---|---|---|---|---|
| 5,375,663 | A * | 12/1994 | Teach | E02F 3/847 701/50 |
| 5,621,643 | A * | 4/1997 | Nakagami | E02F 9/2029 172/3 |
| 5,631,658 | A * | 5/1997 | Gudat | G05D 1/0278 701/1 |
| 5,924,493 | A * | 7/1999 | Hartman | E02F 9/2025 701/50 |
| 7,509,198 | B2 * | 3/2009 | Shull | E02F 3/841 701/50 |
| 8,639,393 | B2 | 1/2014 | Taylor et al. | |
| 9,783,955 | B1 * | 10/2017 | Clar | G05D 1/0219 |
| 2002/0045986 | A1 * | 4/2002 | Tamaru | E02F 9/2054 701/482 |
| 2002/0162668 | A1 * | 11/2002 | Carlson | E02F 9/26 172/1 |
| 2003/0004645 | A1 * | 1/2003 | Kochi | G06T 7/593 348/E13.008 |
| 2009/0256860 | A1 * | 10/2009 | Nichols | G06T 19/00 345/632 |
| 2011/0153117 | A1 * | 6/2011 | Koch | E02F 9/2054 701/2 |
| 2012/0136508 | A1 * | 5/2012 | Taylor | E02F 9/2045 701/25 |
| 2012/0174445 | A1 * | 7/2012 | Jones | G01S 19/53 37/197 |
| 2013/0087350 | A1 * | 4/2013 | Hayashi | E02F 3/844 701/50 |
| 2014/0174770 | A1 * | 6/2014 | Wei | E02F 3/841 701/27 |
| 2014/0180444 | A1 * | 6/2014 | Edara | G05D 1/00 700/56 |
| 2014/0180547 | A1 * | 6/2014 | Edara | G05D 1/0278 701/50 |
| 2015/0019086 | A1 * | 1/2015 | Hayashi | E02F 3/844 172/4 |
| 2016/0076222 | A1 * | 3/2016 | Taylor | E02F 9/2045 701/50 |
| 2016/0076223 | A1 * | 3/2016 | Wei | E02F 3/435 701/50 |
| 2016/0076224 | A1 * | 3/2016 | Edara | E02F 9/2029 701/50 |
| 2016/0077513 | A1 * | 3/2016 | Wei | E02F 9/205 700/114 |
| 2016/0077514 | A1 * | 3/2016 | Taylor | E01C 19/004 700/173 |
| 2016/0273186 | A1 * | 9/2016 | Kami | E02F 9/2296 |
| 2016/0273193 | A1 * | 9/2016 | Matsuyama | E02F 3/437 |
| 2017/0153717 | A1 * | 6/2017 | Moore | G06F 3/0354 |
| 2017/0298580 | A1 * | 10/2017 | Flitsch | E01C 23/065 |
| 2018/0163376 | A1 * | 6/2018 | Redenbo | E02F 3/841 |
| 2018/0202129 | A1 * | 7/2018 | Fujii | E02F 3/842 |
| 2019/0093315 | A1 * | 3/2019 | Ishibashi | G06T 7/529 |

FOREIGN PATENT DOCUMENTS

| | | |
|---|---|---|
| JP | 6-81361 A | 3/1994 |
| JP | 2002-352224 A | 12/2002 |
| JP | 2018-16973 A | 2/2018 |
| WO | 2012/074838 A2 | 6/2012 |
| WO | 2015/181990 A1 | 12/2015 |

OTHER PUBLICATIONS

Office Action for the corresponding Japanese application No. 2018-065143, dated Mar. 8, 2022.

* cited by examiner

CONTROL SYSTEM FOR WORK VEHICLE, METHOD, AND WORK VEHICLE

CROSS-REFERENCE TO RELATED APPLICATIONS

This application is a U.S. National stage application of International Application No. PCT/JP2019/001674, filed on Jan. 21, 2019. This U.S. National stage application claims priority under 35 U.S.C. § 119(a) to Japanese Patent Application No. 2018-065143, filed in Japan on Mar. 29, 2018, the entire contents of which are hereby incorporated herein by reference.

BACKGROUND

Field of the Invention

The present invention relates to a control system for a work vehicle, a method, and a work vehicle.

Background Information

Conventionally, a system for automatically controlling a work vehicle such as a bulldozer or a grader has been proposed. For example, in the system of U.S. Pat. No. 8,639,393, the controller presets a target profile along which a work implement is to operate at a work site from a topography of the work site or the like. The controller starts digging from a start position on an actual topography of the work site, and operates a work implement along the target profile.

SUMMARY

In the above system, in the case where the work implement has not reached a final target position when the digging of a first target profile is completed, a second target profile positioned below the first target profile may be set and digging of the second target profile may be performed. Also, in the case where the work implement has not reached the final target position when the digging of the second target profile is completed, a third target profile positioned further below the second target profile may be set and digging of the third target profile may be performed. Then, digging for the target profile is repeated until the work implement reaches the final target position.

Repeated digging as described above lowers a work position by which a work vehicle performs digging. This makes it difficult to enter or exit from the work position. In this case, work efficiency may reduce.

An object of the present invention is to prevent a reduction in work efficiency under automatic control of the work vehicle.

A control system according to a first aspect is a control system for a work vehicle including a work implement. The control system includes a controller. The controller is programmed to execute the following processing. The controller determines a first target design topography indicating a target trajectory of the work implement. At least a portion of the first target design topography is positioned below an actual topography. The controller determines a second target design topography indicating a target trajectory of the work implement. At least a portion of the second target design topography is positioned below the actual topography and the second target design topography is inclined with respect to the first target design topography. The controller generates a command signal to operate the work implement according to the first target design topography in an area where the first target design topography is positioned above the second target design topography. The controller generates a command signal to operate the work implement according to the second target design topography in an area where the second target design topography is positioned above the first target design topography.

A method according to a second aspect is a method executed by a controller in order to control a work vehicle including a work implement. The method includes the following processing. A first process is to determine a first target design topography indicating a target trajectory of the work implement. At least a portion of the first target design topography is positioned below an actual topography. A second process is to determine a second target design topography indicating a target trajectory of the work implement. At least a portion of the second target design topography is positioned below the actual topography and the second target design topography is inclined with respect to the first target design topography. A third process is to generate a command signal to operate the work implement according to the first target design topography in an area where the first target design topography is positioned above the second target design topography. A fourth process is to generate a command signal to operate the work implement according to the second target design topography in an area where the second target design topography is positioned above the first target design topography.

A work vehicle according to a third aspect is a work vehicle including a work implement and a controller that controls the work implement. The controller is programmed to execute the following processing. The controller determines a first target design topography indicating a target trajectory of the work implement. At least a portion of the first target design topography is positioned below an actual topography. The controller determines an exit path indicating a target trajectory of the work implement. At least a portion of the exit path is positioned below the actual topography and is inclined with respect to the first target design topography. The controller generates a command signal to operate the work implement along the exit path in a region positioned below the actual topography and operate the work implement along the exit path in a region positioned above the actual topography.

According to the first and second aspects, the first target design topography and the second target design topography inclined with respect to the first target design topography are determined. Accordingly, an entry path to a work position or an exit path from a work position of the work vehicle can be ensured by digging the actual topography according to the second target design topography. As a result, a reduction in work efficiency can be prevented. According to the third aspect, the first target design topography and the exit path inclined with respect to the first target design topography are determined. Therefore, an exit path from a work position of the work vehicle can be ensured by digging the actual topography according to the exit path. As a result, a reduction in work efficiency can be prevented.

DETAILED DESCRIPTION OF EMBODIMENT(S)

Figure 1:
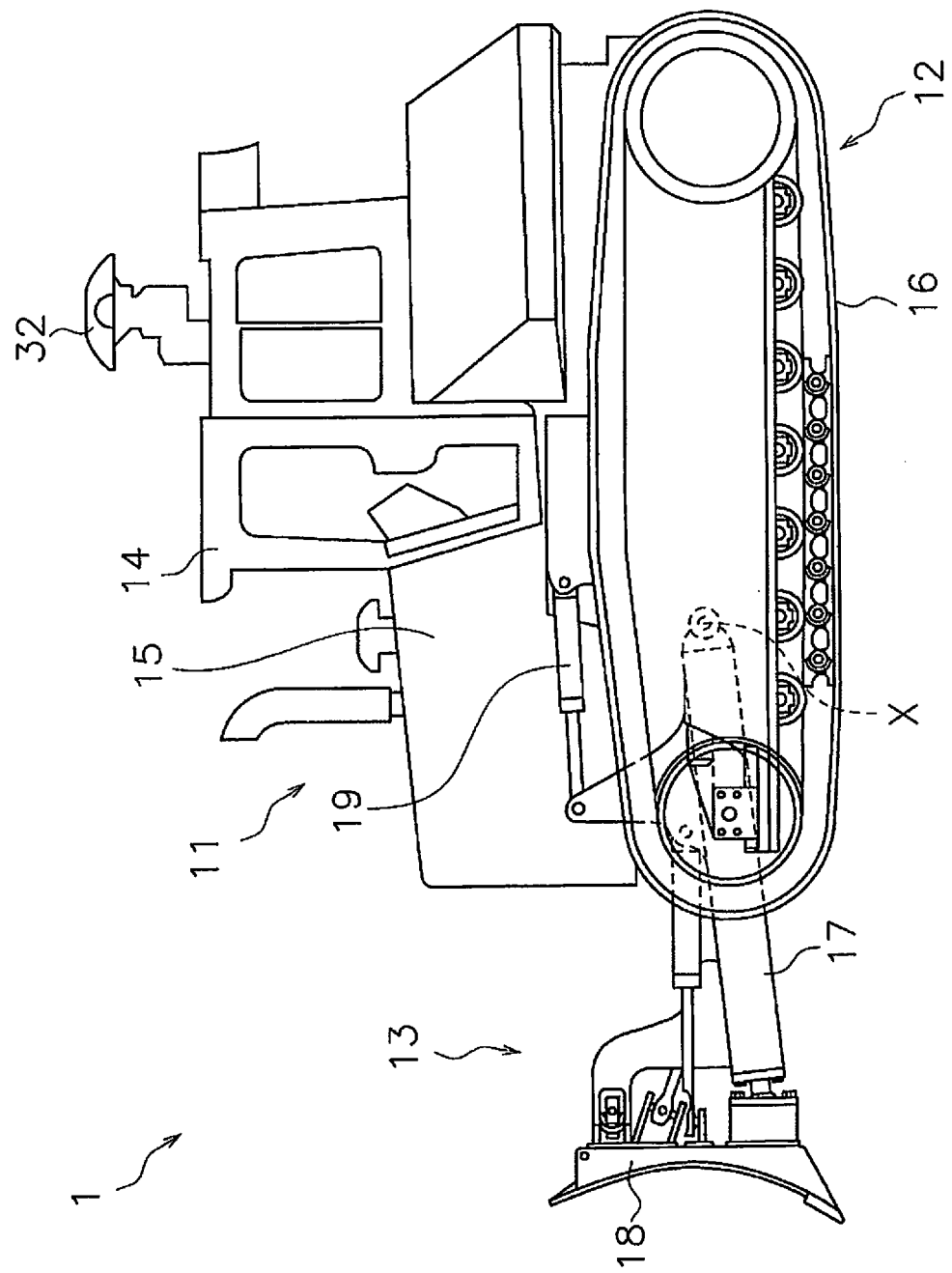
FIG. 1 is a side view of a work vehicle according to an embodiment.

A work vehicle according to an embodiment will now be described with reference to the drawings. FIG. 1 is a side view of a work vehicle 1 according to the embodiment. The work vehicle 1 according to the present embodiment is a bulldozer. The work vehicle 1 includes a vehicle body 11, a travel device 12, and a work implement 13.

The vehicle body 11 includes an operating cabin 14 and an engine compartment 15. An operator's seat that is not illustrated is disposed in the operating cabin 14. The engine compartment 15 is disposed in front of the operating cabin 14. The travel device 12 is attached to a bottom portion of the vehicle body 11. The travel device 12 includes a pair of right and left crawler belts 16. Only the left crawler belt 16 is illustrated in FIG. 1. The work vehicle 1 travels due to the rotation of the crawler belts 16.

The work implement 13 is attached to the vehicle body 11. The work implement 13 includes a lift frame 17, a blade 18, and a lift cylinder 19.

The lift frame 17 is attached to the vehicle body 11 so as to be movable up and down around an axis X extending in the vehicle width direction. The lift frame 17 supports the blade 18. The blade 18 is disposed in front of the vehicle body 11. The blade 18 moves up and down as the lift frame 17 moves up and down. The lift frame 17 may be attached to the travel device 12.

The lift cylinder 19 is coupled to the vehicle body 11 and the lift frame 17. Due to the extension and contraction of the lift cylinder 19, the lift frame 17 rotates up and down around the axis X.

Figure 2:
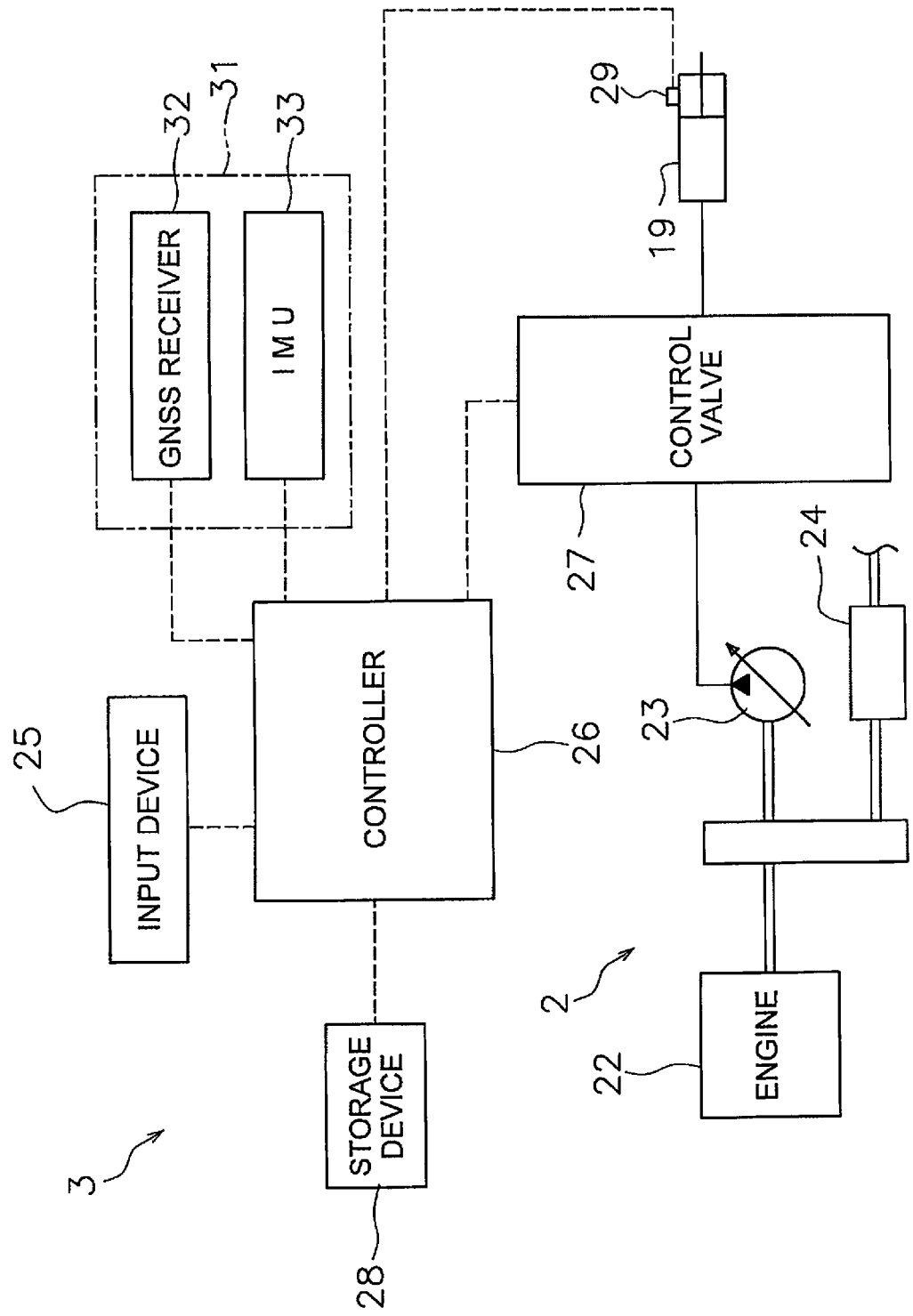
FIG. 2 is a block diagram of a configuration of a drive system and a control system of the work vehicle.

FIG. 2 is a block diagram of a configuration of a drive system 2 and a control system 3 of the work vehicle 1. As illustrated in FIG. 2, the drive system 2 includes an engine 22, a hydraulic pump 23, and a power transmission device 24.

The hydraulic pump 23 is driven by the engine 22 to discharge hydraulic fluid. The hydraulic fluid discharged from the hydraulic pump 23 is supplied to the lift cylinder 19. Although only one hydraulic pump 23 is illustrated in FIG. 2, a plurality of hydraulic pumps may be provided.

The power transmission device 24 transmits driving force of the engine 22 to the travel device 12. The power transmission device 24 may be a hydro static transmission (HST), for example. Alternatively, the power transmission device 24 may be, for example, a torque converter or a transmission having a plurality of transmission gears.

The control system 3 includes an input device 25, a controller 26, a storage device 28, and a control valve 27. The input device 25 is disposed in the operating cabin 14. The input device 25 is a device for setting automatic control of the work vehicle 1 as described later. The input device 25 receives an operation by an operator and outputs an operation signal corresponding to the operation. The operation signal of the input device 25 is output to the controller 26.

The input device 25 includes, for example, a touch screen type display. The input device 25 is not limited to a touch screen type, and may include hardware keys. The input device 25 may be disposed at a location (for example, a control center) that is away from the work vehicle 1. The operator may operate the work vehicle 1 from the input device 25 in the control center via wireless communication.

The controller 26 is programmed to control the work vehicle 1 based on acquired data. The controller 26 includes, for example, a processor such as a CPU. The controller 26 acquires an operation signal from the input device 25. The controller 26 is not limited to one unit and may be divided into a plurality of controllers. The controller 26 causes the work vehicle 1 to travel by controlling the travel device 12 or the power transmission device 24. The controller 26 moves the blade 18 up and down by controlling the control valve 27.

The control valve 27 is a proportional control valve and is controlled by a command signal from the controller 26. The control valve 27 is disposed between a hydraulic actuator such as the lift cylinder 19 and the hydraulic pump 23. The control valve 27 controls the flow rate of the hydraulic fluid supplied from the hydraulic pump 23 to the lift cylinder 19. The controller 26 generates a command signal to the control valve 27 so that the blade 18 operates. As a result, the lift cylinder 19 is controlled. The control valve 27 may be a pressure proportional control valve. Alternatively, the control valve 27 may be an electromagnetic proportional control valve.

Figure 3:
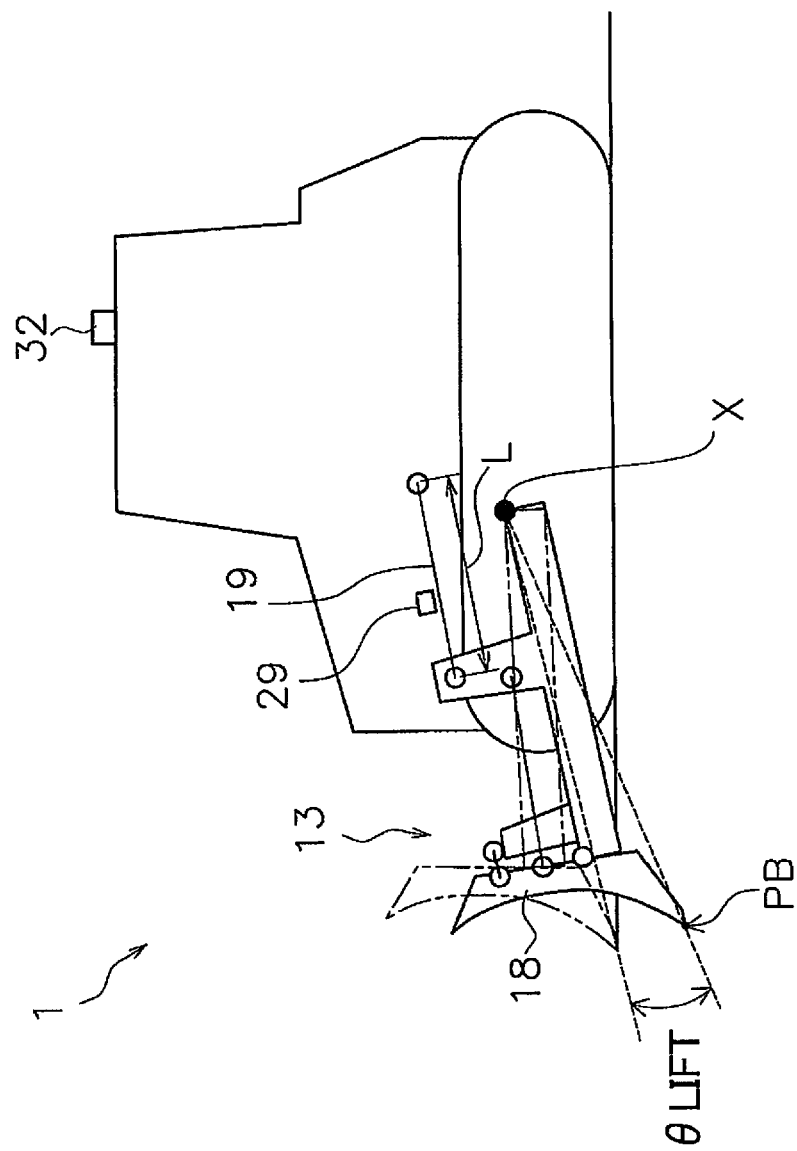
FIG. 3 is a schematic view of a configuration of a work vehicle.

The control system 3 includes a work implement sensor 29. The work implement sensor 29 senses a position of the work implement 13 and outputs a work implement position signal indicating the position of the work implement. The work implement sensor 29 may be a displacement sensor that senses the displacement of the work implement 13. Specifically, the work implement sensor 29 senses the stroke length of the lift cylinder 19 (hereinafter referred to as "lift cylinder length L"). As illustrated in FIG. 3, the controller 26 calculates a lift angle ° lift of the blade 18 based on the lift cylinder length L. The work implement sensor 29 may be a rotation sensor that directly senses the rotation angle of the work implement 13.

FIG. 3 is a schematic view of a configuration of the work vehicle 1. In FIG. 3, a reference position of the work implement 13 is indicated by a chain double-dashed line. The reference position of the work implement 13 is a position of the blade 18 in a state where the tip of the blade 18 is in contact with the ground surface on a horizontal ground surface. The lift angle θlift is the angle from the reference position of the work implement 13.

As illustrated in FIG. 2, the control system 3 includes a position sensor 31. The position sensor 31 measures a position of the work vehicle 1. The position sensor 31 includes a global navigation satellite system (GNSS) receiver 32 and an IMU 33. The GNSS receiver 32 is, for example, a receiver for global positioning system (GPS). For example, an antenna of the GNSS receiver 32 is disposed on the operating cabin 14. The GNSS receiver 32 receives a positioning signal from a satellite and calculates the position of the antenna based on the positioning signal to generate vehicle body position data. The controller 26 acquires the vehicle body position data from the GNSS receiver 32. The controller 26 acquires the traveling direction and vehicle speed of the work vehicle 1 from the vehicle body position data.

The vehicle body position data may not be data of the antenna position. The vehicle body position data may be data indicating the position of any location whose relationship with the antenna position is fixed in the work vehicle 1 or at the surroundings of the work vehicle 1.

The IMU 33 is an inertial measurement unit. The IMU 33 acquires vehicle body inclination angle data. The vehicle body inclination angle data includes an angle (pitch angle) with respect to the horizontal in the vehicle longitudinal direction and an angle (roll angle) with respect to the horizontal in the vehicle lateral direction. The controller 26 acquires the vehicle body inclination angle data from the IMU 33.

The controller 26 calculates a blade tip position PB from the lift cylinder length L, the vehicle body position data, and the vehicle body inclination angle data. As illustrated in FIG. 3, the controller 26 calculates global coordinates of the GNSS receiver 32 based on the vehicle body position data. The controller 26 calculates the lift angle θlift based on the lift cylinder length L. The controller 26 calculates local coordinates of the blade tip position PB with respect to the GNSS receiver 32 based on the lift angle θlift and vehicle body dimension data. The vehicle body dimension data is stored in the storage device 28 and indicates the position of the work implement 13 with respect to the GNSS receiver 32. The controller 26 calculates the global coordinates of the blade tip position PB based on the global coordinates of the GNSS receiver 32, the local coordinates of the blade tip position PB, and the vehicle body inclination angle data. The controller 26 acquires the global coordinates of the blade tip position PB as blade tip position data.

The storage device 28 includes, for example, a memory and an auxiliary storage device. The storage device 28 may be a RAM, a ROM or the like. The storage device 28 may be a semiconductor memory, a hard disk or the like. The storage device 28 is an example of a non-transitory computer-readable recording medium. The storage device 28 stores computer commands that are executable by the processor and for controlling the work vehicle 1.

The storage device 28 stores design topography data and work site topography data. The design topography data indicates a final design topography. The final design topography is a final target shape of a surface of the work site. The design topography data is, for example, a construction drawing in a three-dimensional data format. The work site topography data indicates a wide topography of the work site. The work site topography data is, for example, an actual topography survey map in a three-dimensional data format. The work site topography data can be acquired by aerial laser survey, for example.

The controller 26 acquires actual topography data. The actual topography data indicates an actual topography of the work site. The actual topography of the work site is a topography of a region along the traveling direction of the work vehicle 1. The actual topography data is acquired by calculation in the controller 26 from the work site topography data and the position and traveling direction of the work vehicle 1 acquired from the aforementioned position sensor 31. The actual topography data may be acquired from distance measurement of the actual topography by, for example, a laser imaging detection and ranging (LIDAR) mounted on the vehicle.

The controller 26 automatically controls the work implement 13 based on the actual topography data, the design topography data, and the blade tip position data. The automatic control of the work implement 13 may be semi-automatic control performed in combination with manual operation by the operator. Alternatively, the automatic control of the work implement 13 may be fully automatic control performed without manual operation by an operator. The traveling of the work vehicle 1 may be automatically controlled by the controller 26. For example, the traveling control of the work vehicle 1 may be fully automatic control performed without manual operation by an operator. Alternatively, the traveling control may be semi-automatic control performed in combination with manual operation by the operator. Alternatively, the traveling of the work vehicle 1 may be performed with manual operation by the operator.

Figure 4:
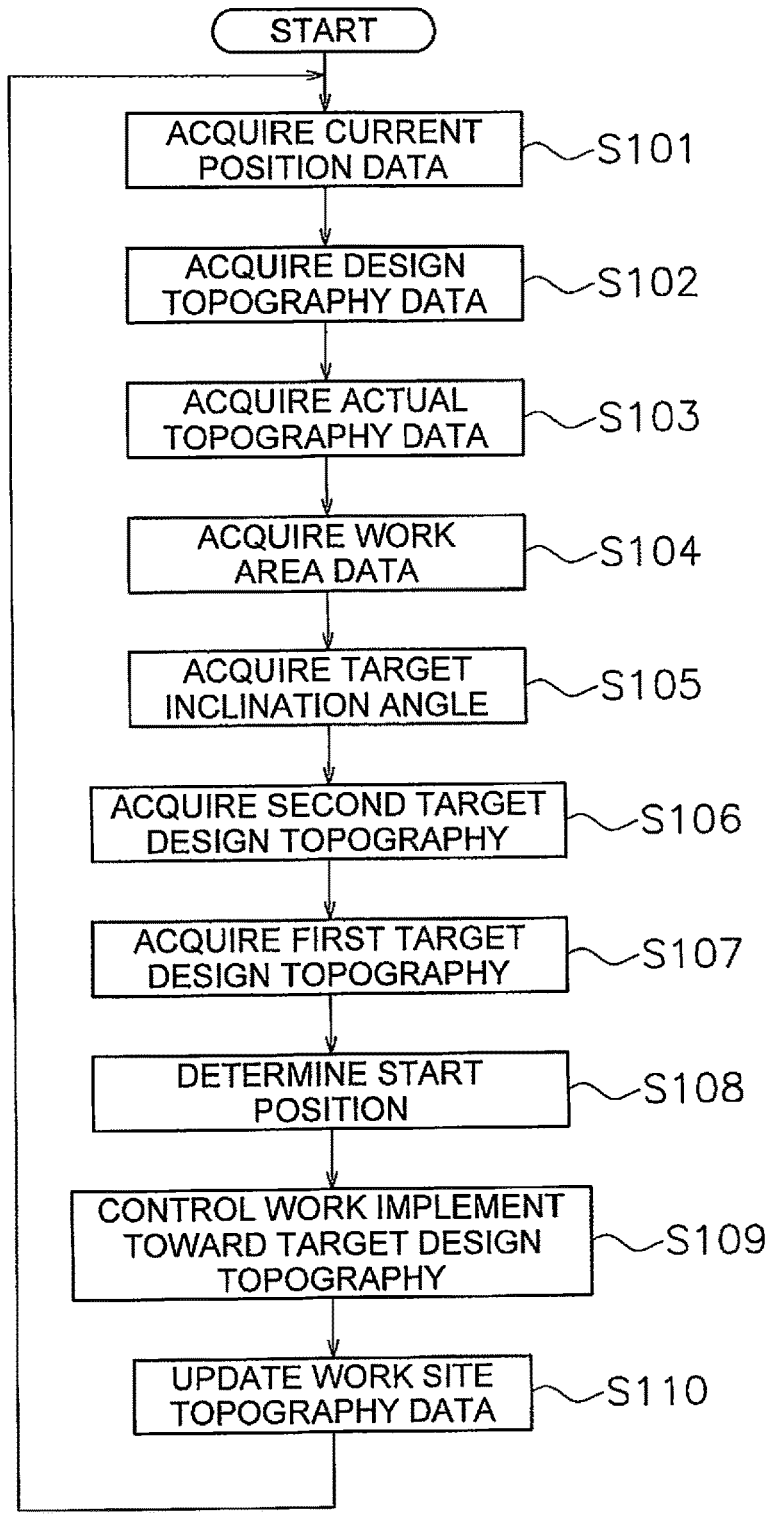
FIG. 4 is a flowchart illustrating processing of automatic control of the work vehicle.

The automatic control of the work vehicle 1 in digging executed by the controller 26 will be described below. In the following description, for example, the work vehicle 1 travels back and forth on each slot in slot dozing to dig each slot. FIG. 4 is a flowchart illustrating processing of automatic control of the work vehicle 1.

As illustrated in FIG. 4, in step S101, the controller 26 acquires current position data. At this time, the controller 26 acquires the current blade tip position PB of the blade 18 as described above.

Figure 5:
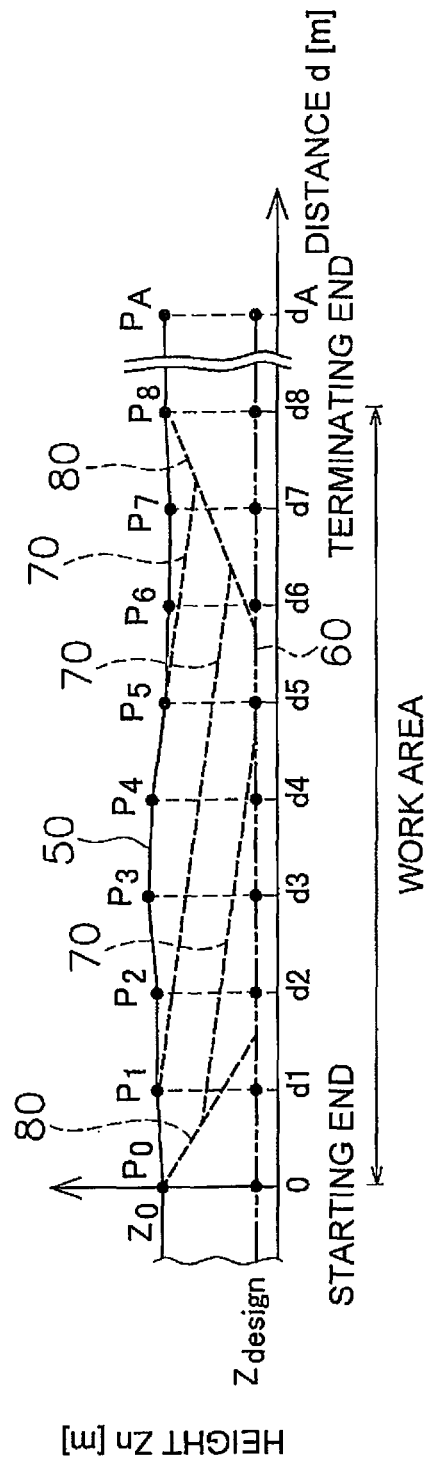
FIG. 5 is a diagram illustrating an example of a final design topography, an actual topography, a first target design topography and a second target design topography.

In step S102, the controller 26 acquires design topography data. As illustrated in FIG. 5, the design topography data includes a height Zdesign of a final design topography 60 at a plurality of reference points Pn (n=0, 1, 2, 3, . . . , A) in the traveling direction of the work vehicle 1. The plurality of reference points Pn indicate a plurality of points at a predetermined interval along the traveling direction of the work vehicle 1. The plurality of reference points Pn are on a travel path of the blade 18. In FIG. 5, the final design topography 60 has a flat shape parallel to the horizontal direction, but may have a different shape.

In step S103, the controller 26 acquires actual topography data. The controller 26 acquires the actual topography data by calculation from the work site topography data acquired from the storage device 28 and the vehicle body position data and traveling direction data acquired from the position sensor 31.

The actual topography data is information indicating a topography positioned in the traveling direction of the work vehicle 1. FIG. 5 illustrates a cross section of an actual topography 50. In FIG. 5, the vertical axis indicates the height of the topography, and the horizontal axis indicates the distance from the current position in the traveling direction of work vehicle 1.

Specifically, the actual topography data includes the height Zn of the actual topography 50 at the plurality of reference points Pn from the current position to a predetermined topography recognition distance dA in the traveling direction of the work vehicle 1. In the present embodiment, the current position is a position determined based on the current blade tip position PB of the work vehicle 1. The current position may be determined based on a current position of another portion of the work vehicle 1. The plurality of reference points are arranged at a predetermined interval, for example, every one meter.

In step S104, the controller 26 acquires work area data. The work area data indicates a work area set by the input device 25. As illustrated in FIG. 5, the work area includes a starting end and a terminating end. The work area data includes the coordinates of the starting end and the coordinates of the terminating end. Alternatively, the work area data may include the coordinates of the starting end and the length of the work area, and the coordinates of the terminating end may be calculated from the coordinates of the starting end and the length of the work area. Alternatively, the work area data may include the coordinates of the terminating end and the length of the work area, and the coordinates of the starting end may be calculated from the coordinates of the terminating end and the length of the work area.

The controller 26 acquires the work area data based on an operation signal from the input device 25. The controller 26 may acquire the work area data by another method. For example, the controller 26 may acquire the work area data from an external computer that performs construction management of the work site.

In step S105, the controller 26 acquires a target inclination angle. The controller 26 acquires the target inclination angle of a first target design topography 70 and the target inclination angle of a second target design topography 80. The first target design topography 70 and the second target design topography 80 indicate desired trajectories of the tip of the blade 18 in work. The first target design topography 70 and the second target design topography 80 are target profiles of a topography to be worked, and indicate desired shapes as a result of digging work.

At least a portion of the first target design topography 70 is positioned below the actual topography 50. The first target design topography 70 is inclined with respect to the horizontal direction. The target inclination angle of the first target design topography 70 is a target angle of the first target design topography 70 with respect to the horizontal direction.

At least a portion of the second target design topography 80 is positioned below the actual topography 50. The second target design topography 80 is inclined with respect to the horizontal direction. Alternatively, the target inclination angle of the second target design topography 80 is a target angle of the second target design topography 80 with respect to the horizontal direction.

Figure 6:
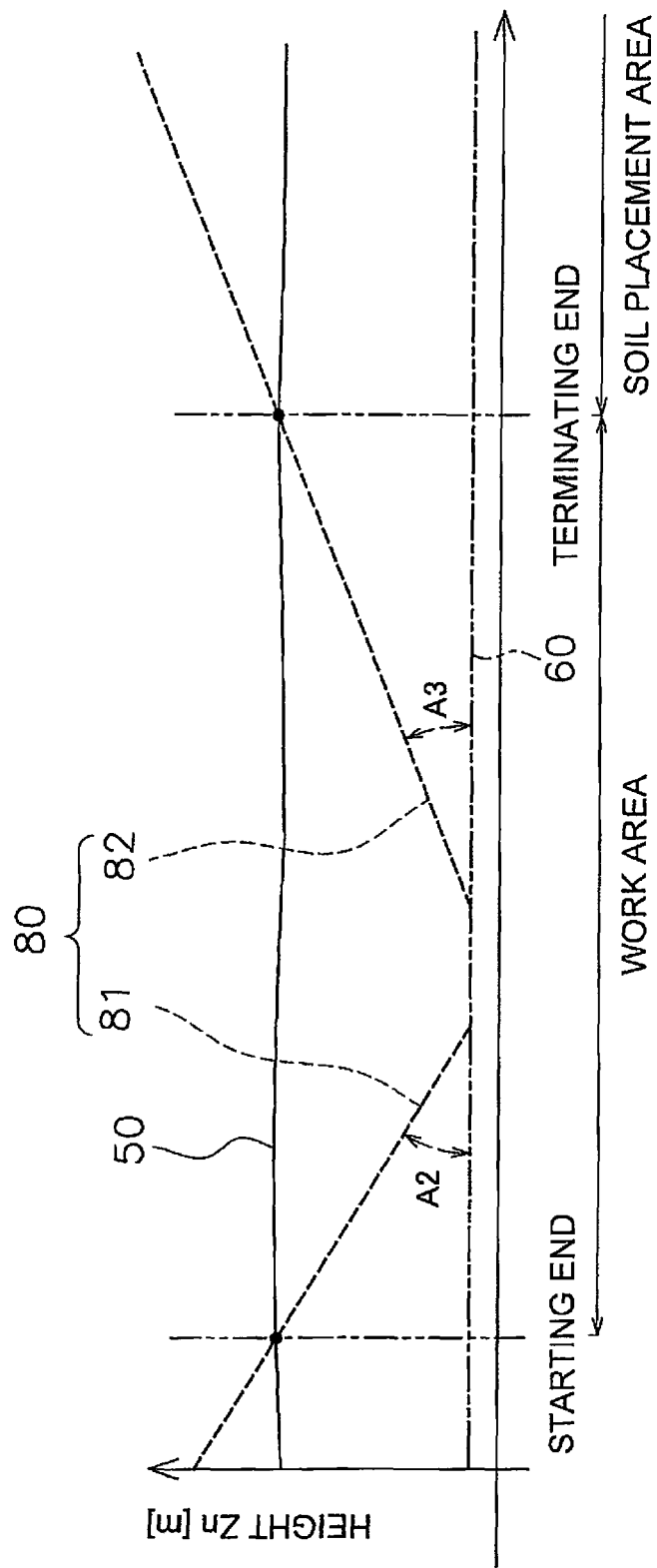
FIG. 6 is a diagram illustrating an example of the second target design topography.

FIG. 6 is a diagram illustrating an example of the second target design topography 80. As illustrated in FIG. 6, the second target design topography 80 includes an entry path 81 and an exit path 82. The controller 26 acquires a target inclination angle A2 of the entry path 81 and a target inclination angle A3 of the exit path 82. The target inclination angle A2 of the entry path 81 and the target inclination angle A3 of the exit path 82 may be settable independently. That is, the target inclination angle A2 of the entry path 81 and the target inclination angle A3 of the exit path 82 may be different from each other. Alternatively, the target inclination angle A2 of the entry path 81 and the target inclination angle A3 of the exit path 82 may be the same.

The target inclination angle A2 of the entry path 81 is desirably kept within a range of an angle at which the work vehicle 1 can travel backward when the work vehicle 1 travels backward on the entry path 81. This is because, in the case where the target inclination angle A2 of the entry path 81 is set to an angle larger than the angle at which the work vehicle 1 can travel backward, it is difficult for the work vehicle 1 to travel backward on the entry path 81, and this reduces work efficiency. It is desirable that the target inclination angle A2 of the entry path 81 be set to an angle close to the upper limit of the angle at which the vehicle can travel backward because the ability of the work vehicle 1 can be exhibited to the maximum and work efficiency can be improved.

The target inclination angle A3 of the exit path 82 is desirably kept within a range of angle at which the work vehicle 1 can travel forward when the work vehicle 1 travels forward on the exit path 82. This is because, in the case where the target inclination angle A3 of the exit path 82 is set to an angle larger than the angle at which the work vehicle 1 can travel forward, it is difficult for the work vehicle 1 to travel forward on the exit path 82, and this reduces work efficiency. It is desirable that the target inclination angle A3 of the exit path 82 be set to an angle close to the upper limit of the angle at which the work vehicle 1 can travel forward because the ability of the work vehicle 1 can be exhibited to the maximum and work efficiency can be improved.

Since the work vehicle 1 does not transport the soil when traveling backward, the load on the work vehicle 1 is smaller as compared to when traveling forward in which the work vehicle 1 transports the soil. Accordingly, the target inclination angle A2 of the entry path 81 through which the work vehicle 1 passes when traveling backward may be set to an angle larger than the target inclination angle A3 of the exit path 82 through which the work vehicle passes when traveling forward. This enables the work vehicle 1 to further exhibit the ability and work efficiency can be improved.

The controller 26 acquires the target inclination angle based on an operation signal from the input device 25. That is, the target inclination angle is set by the operator operating the input device 25. The controller 26 may acquire the target inclination angle by another method. For example, the controller 26 may acquire the target inclination angle from an external computer that performs construction management of the work site. Alternatively, the controller 26 may automatically determine the target inclination angle. For example, the controller 26 may determine the target inclination angle from the load on the work vehicle 1, machine capacity of the work vehicle 1 or the like.

In step S106, the controller 26 determines second target design topography data. The second target design topography data indicates the second target design topography 80. The controller 26 determines the second target design topography 80 so that at least a portion of the second target design topography 80 is positioned below the actual topography 50 in the work area. That is, the controller 26 determines the second target design topography 80 so that at least a portion of the second target design topography 80 is positioned below the actual topography 50 at a position that is behind the terminating end of the work area and ahead of the starting end of the work area in the traveling direction of the work vehicle.

Specifically, the controller 26 determines the entry path 81 so that the entry path 81 passes through the starting end of the work area. The controller 26 determines the entry path 81 so that the entry path 81 inclines forward and downward in the traveling direction of the work vehicle 1. The controller 26 determines the entry path 81 so that the angle of the entry path 81 with respect to the horizontal direction is the aforementioned target inclination angle A2. A portion of the entry path 81 is positioned in the work area. A portion of the entry path 81 extends to a position behind the starting end in the traveling direction of the work vehicle 1.

The exit path 82 is positioned ahead of the entry path 81 in the traveling direction of the work vehicle 1. The controller 26 determines the exit path 82 so that the exit path 82 passes through the terminating end of the work area. The controller 26 determines the exit path 82 so that the exit path 82 inclines forward and upward in the traveling direction of the work vehicle 1. The controller determines the exit path 82 so that the angle of the exit path 82 with respect to the horizontal direction is the aforementioned target inclination angle A3. A portion of the exit path 82 is positioned in the work area. A portion of the exit path 82 extends to a position ahead of the terminating end in the traveling direction of the work vehicle 1.

The controller 26 determines the second target design topography 80 so that the second target design topography 80 does not go below the final design topography 60. Accordingly, the controller 26 determines the second target design topography 80 so that the second target design topography 80 is positioned at or above the final design topography 60 and below the actual topography 50.

Figure 7:
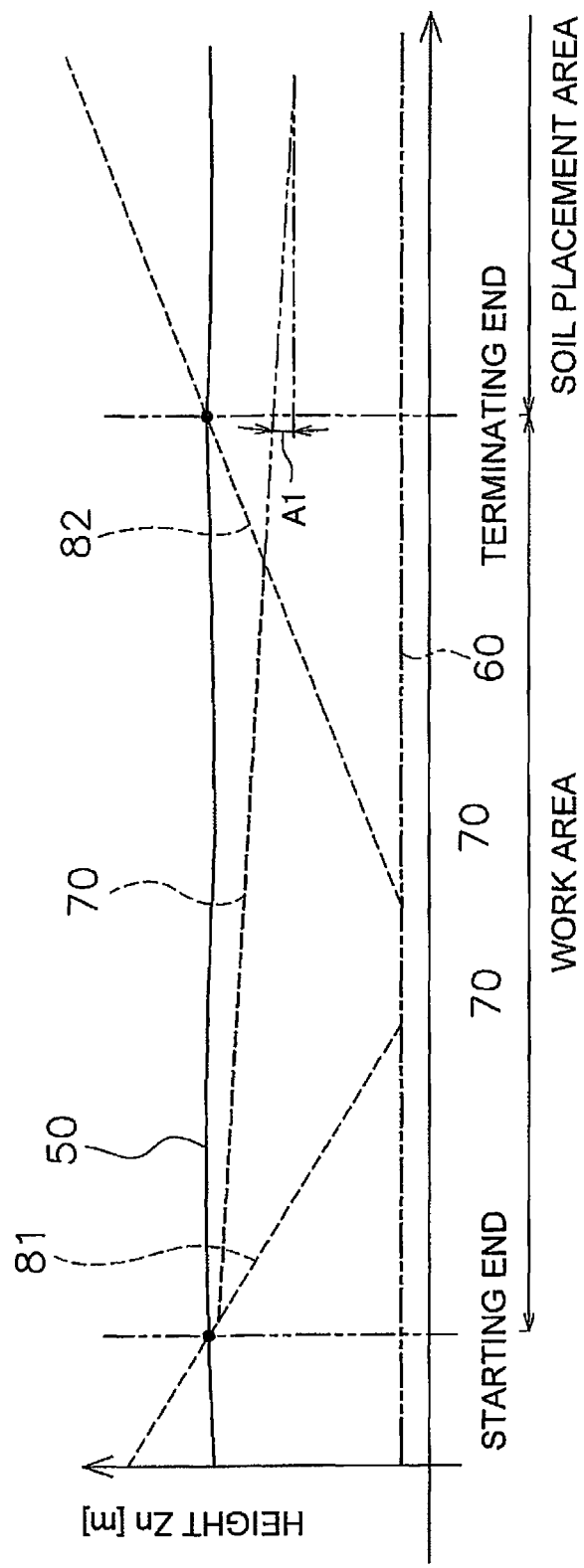
FIG. 7 is a diagram illustrating an example of the first target design topography.

In step S107, the controller 26 determines first target design topography data. The first target design topography data indicates the first target design topography 70. As illustrated in FIG. 7, the controller 26 determines the first target design topography 70 at least partially positioned below the actual topography 50 in the work area. The controller 26 determines the first target design topography 70 so that the angle of the first target design topography 70 with respect to the horizontal direction is the target inclination angle A1. The controller 26 determines the first target design topography 70 so that at least a portion of the first target design topography 70 is positioned between the entry path 81 and the exit path 82. Alternatively, the controller 26 may determine the first target design topography 70 so that the first target design topography 70 intersects the entry path 81 or the exit path 82.

Figure 8:
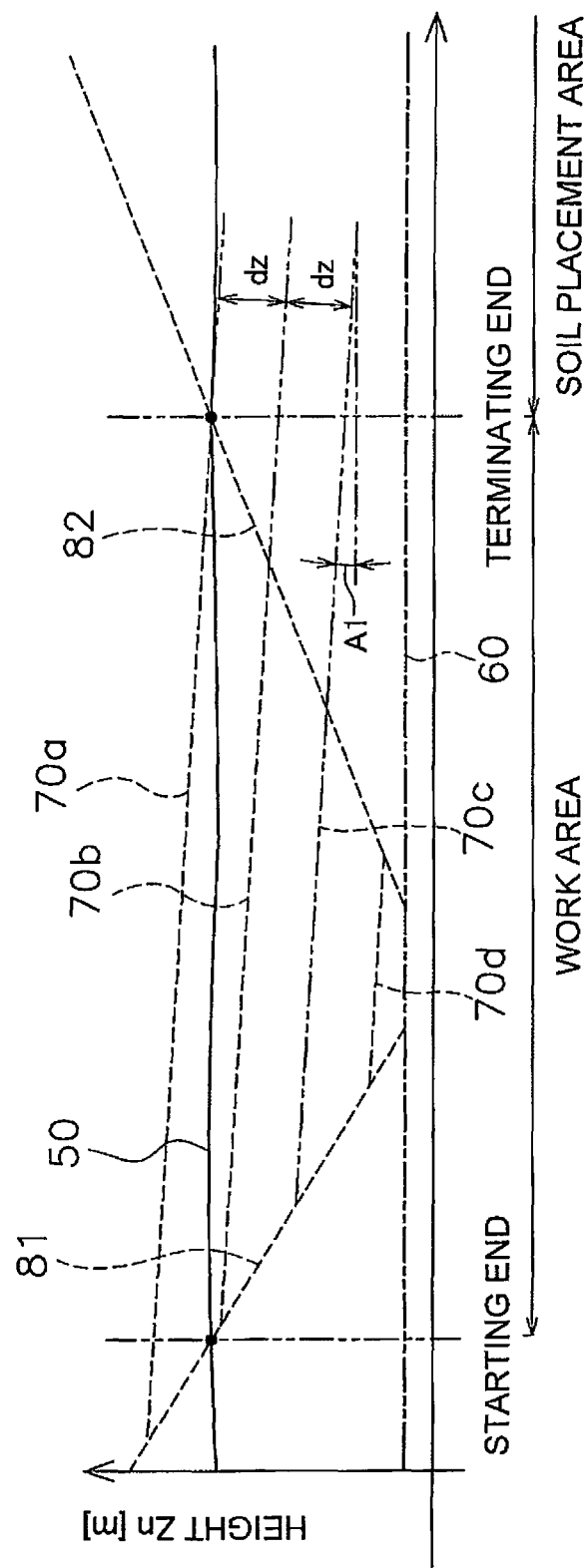
FIG. 8 is a diagram illustrating an example of the first target design topography.

Specifically, as illustrated in FIG. 8, the controller 26 generates a plurality of first target design topographies 70a to 70d that are vertically displaced from each other by a predetermined distance dZ. The predetermined distance dZ may be set based on an operation signal from the input device 25. The predetermined distance dZ may be acquired from an external computer that performs construction management of the work site. The predetermined distance dZ may be a fixed value. The controller 26 selects one topography immediately below the actual topography 50 (the first target design topography 70b in the example illustrated in FIG. 8) among the plurality of first target design topographies 70a to 70d to determine the selected topography as the first target design topography 70. The controller 26 may determine one first target design topography 70 positioned below the actual topography 50, instead of selecting one topography among the plurality of first target design topographies 70.

The controller 26 determines the first target design topography 70 so that the first target design topography 70 does not go below the final design topography 60. Therefore, the controller 26 determines the first target design topography 70 positioned at or above the final design topography 60 and below the actual topography 50.

Figure 9:
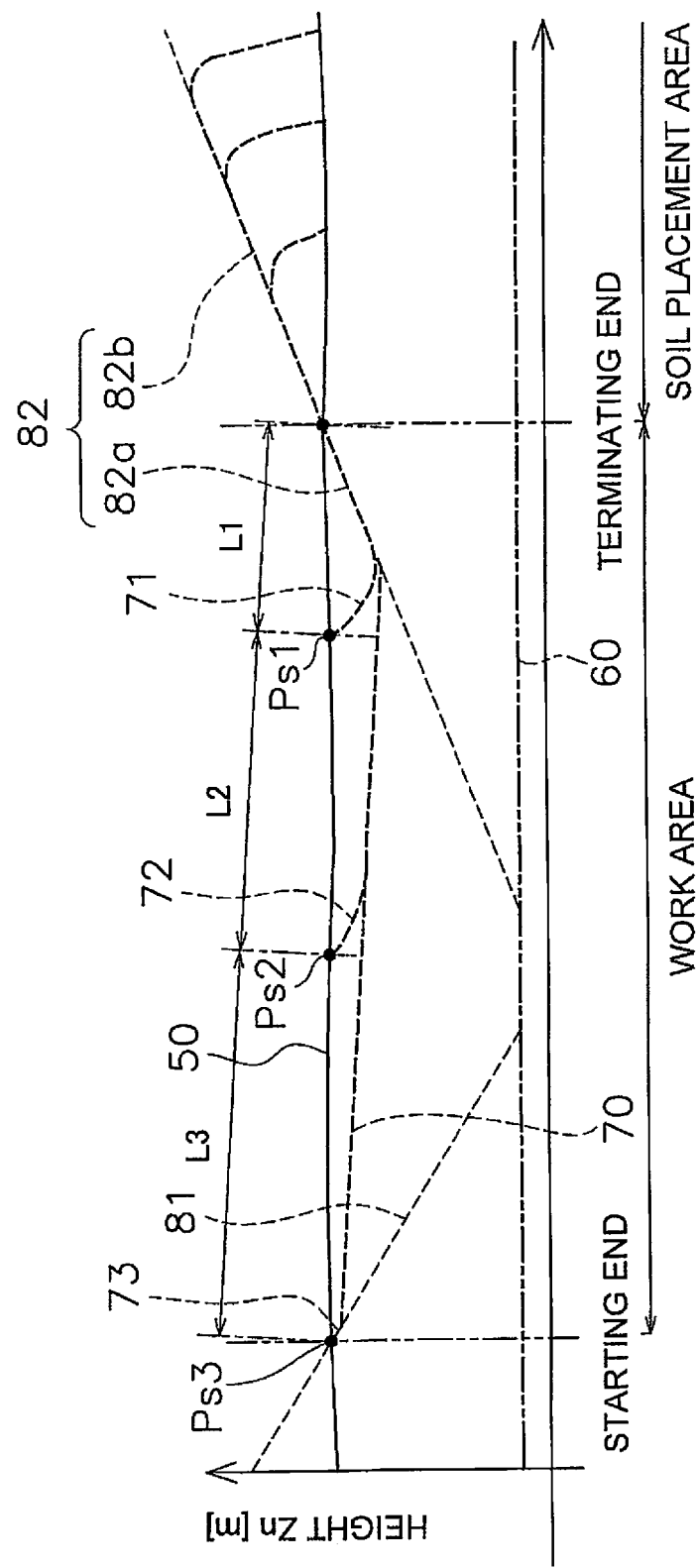
FIG. 9 is a diagram illustrating an example of a work start position.

In step S108, the controller 26 determines a start position of work. As illustrated in FIG. 9, the controller 26 performs digging according to the first target design topography 70 for each of a plurality of cuts 71 to 73 aligned in the traveling direction of the work vehicle 1. In the first target design topography 70, the controller 26 determines start positions Ps1 to Ps3 of work on each of the cuts 71 to 73 in the work area and the working order. The controller 26 determines, for example, positions that are away from the terminating end by predetermined distances L1 to L3 as the start positions Ps1 to Ps3.

Specifically, the controller 26 determines, as a first start position Ps1, a position that is away from the terminating end of the work area toward the starting end by the predetermined distance L1. The controller 26 determines, as a second start position Ps2, a position that is away from the first start position Ps1 toward the starting end by the predetermined distance L2. The controller 26 determines, as a third start position Ps3, a position that is away from the second start position Ps2 toward the starting end by the predetermined distance L3. The number of the start position is not limited to three, and may be less than three or more than three. The controller 26 determines the working order so as to perform digging in order from the start position closer to the terminating end among the plurality of start positions Ps1 to Ps3.

The controller 26 may determine the start positions Ps1 to Ps3 according to the rated output of the work vehicle 1 or machine capacity of the work vehicle 1 such as the capacity of the blade 18. The controller 26 may determine the start positions Ps1 to Ps3 according to the amount of soil between the actual topography 50 and the first target design topography 70. Alternatively, the controller 26 may determine the predetermined distances L1 to L3 based on the operation signal from the input device 25. The controller 26 may determine the predetermined distances L1 to L3 according to the length of the work area.

As illustrated in FIG. 8, the controller 26 may determine the entry path 81 or the exit path 82 so that the entry path 81 or the exit path 82 intersects the plurality of first target design topographies 70. This enables to prevent a situation in which the work vehicle 1 digs too deeply in digging work to make it difficult to enter or exit from the work position. Even in the case where the controller 26 determines one first target design topography 70b, completes digging work along the first target design topography 70b, and subsequently determines another first target design topography 70c, the entry path 81 or the exit path 82 may intersect the plurality of first target design topographies 70.

In step S109, the controller 26 controls the blade 18 toward the target design topographies 70 and 80. The controller 26 generates a command signal to the work implement 13 so that work with the work implement 13 starts from the start positions Ps1 to Ps3 determined in step S108, and the blade tip position of the blade 18 moves according to the second target design topography 80 generated in step S106 and the first target design topography 70 generated in step S107.

A path of each of the cuts 71 to 73 from each of the start positions Ps1 to Ps3 to the first target design topography 70 and the second target design topography 80 is determined depending on work conditions such as the vehicle speed of the work vehicle 1, the lowering speed of the work implement 13, or hardness of the topography. The controller 26 may determine a target path of each of the cuts 71 to 73 based on the start positions Ps1 to Ps3, the first target design topography 70 and the second target design topography 80. The controller 26 may control the blade 18 so that the blade 18 is along the determined target path of each of the cuts 71 to 73.

The controller 26 generates a command signal so that the blade tip position of the blade 18 moves according to the upper one of the first target design topography 70 and the second target design topography 80. The generated command signal is input to the control valve 27.

Specifically, the controller 26 operates the work implement 13 according to the first target design topography 70 in an area where the first target design topography 70 is positioned above the second target design topography 80 in the traveling direction of the work vehicle 1. The controller 26 operates the work implement 13 according to the second target design topography 80 in an area where the second target design topography 80 is positioned above the first target design topography 70.

For example, as illustrated in FIG. 9, the controller 26 moves the tip of the blade 18 from the first start position Ps1 toward the first target design topography 70 and moves the tip of the blade 18 along the first target design topography 70 and the exit path 82. Accordingly, the digging of the cut 71 is performed. The controller 26 moves the tip of the blade 18 along the exit path 82 to a soil placement area beyond the terminating end. As a result, the soil dug in the work area is discharged from the blade 18 in the soil placement area.

As illustrated in FIG. 9, the exit path 82 includes a region 82a positioned below the actual topography 50 and a region 82b positioned above the actual topography 50. The controller 26 operates the work implement 13 along the exit path 82 in the region 82a positioned below the actual topography 50 and operates the work implement 13 along the exit path 82 in the region 82b positioned above the actual topography 50. In the region 82a positioned below the actual topography 50, the work implement 13 operates along the exit path 82 to perform digging. In the region 82b positioned above the actual topography 50, as the work implement 13 operates along the exit path 82, the dug soil is discharged from the work implement 13 and laid on the actual topography 50.

When the digging of the cut 71 from the first start position Ps1 is completed, the controller 26 moves the work vehicle 1 to the second start position Ps2. The controller 26 moves the tip of the blade 18 from the second start position Ps2 toward the first target design topography 70, and moves the tip of the blade 18 along the first target design topography 70 and the exit path 82. As a result, the digging of the cut 72 is performed. The controller 26 moves the tip of the blade 18 along the exit path 82 to the soil placement area beyond the terminating end. As a result, the soil dug in the work area is discharged from the blade 18 in the soil placement area.

Figure 10:
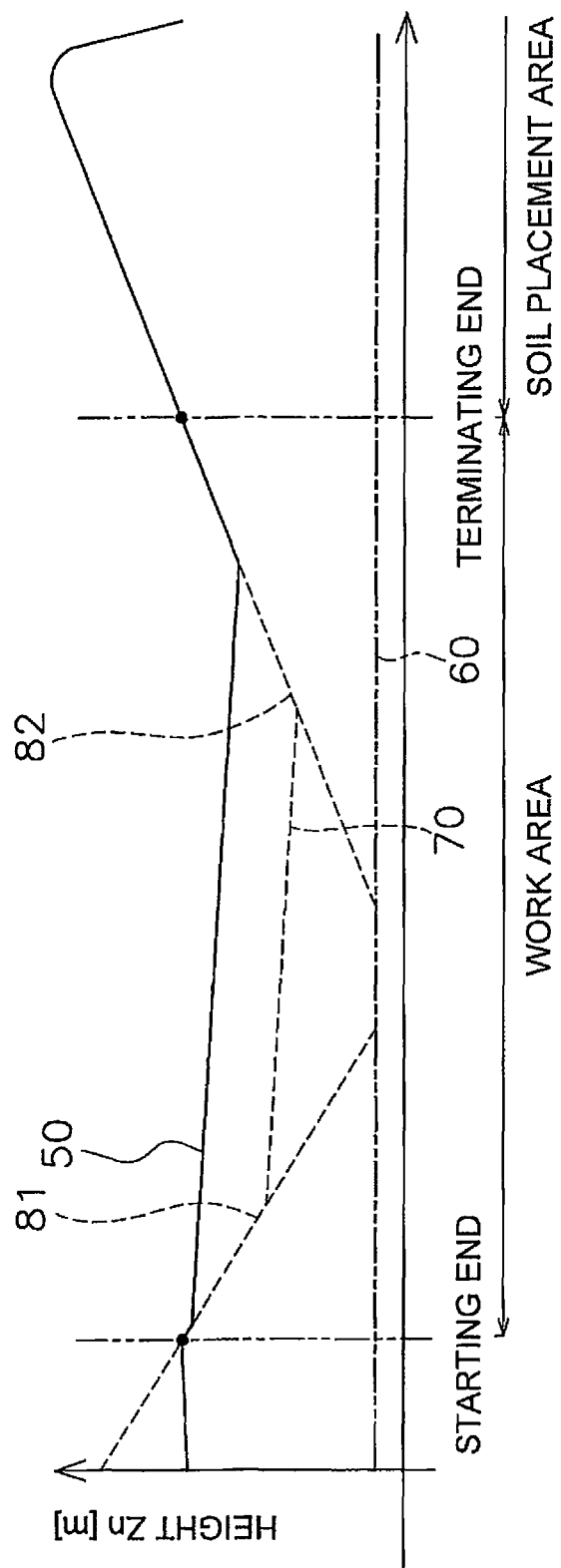
FIG. 10 is a diagram illustrating an example of a dug actual topography.

When the digging of the cut 72 from the second start position Ps2 is completed, the controller 26 moves the work vehicle 1 to the third start position Ps3. The controller 26 moves the tip of the blade 18 from the third start position Ps3 along the entry path 81, the first target design topography 70, and the exit path 82. As a result, the digging of the cut 73 is performed. The controller 26 moves the tip of the blade 18 along the exit path 82 to the soil placement area beyond the terminating end. As a result, the soil dug in the work area is discharged from the blade 18 in the soil placement area. In this way, by repeating the work from each start position, the digging of one first target design topography 70 is completed in the work area as illustrated in FIG. 10.

When the digging of one first target design topography 70 is completed in the work area, the controller 26 determines work start positions of each of cuts and the working order for a next first target design topography 70 positioned further below and starts digging of each cut. By repeating such processing, digging is performed so that the actual topography 50 approaches the final design topography 60 as illustrated in FIG. 11.

Figure 11:
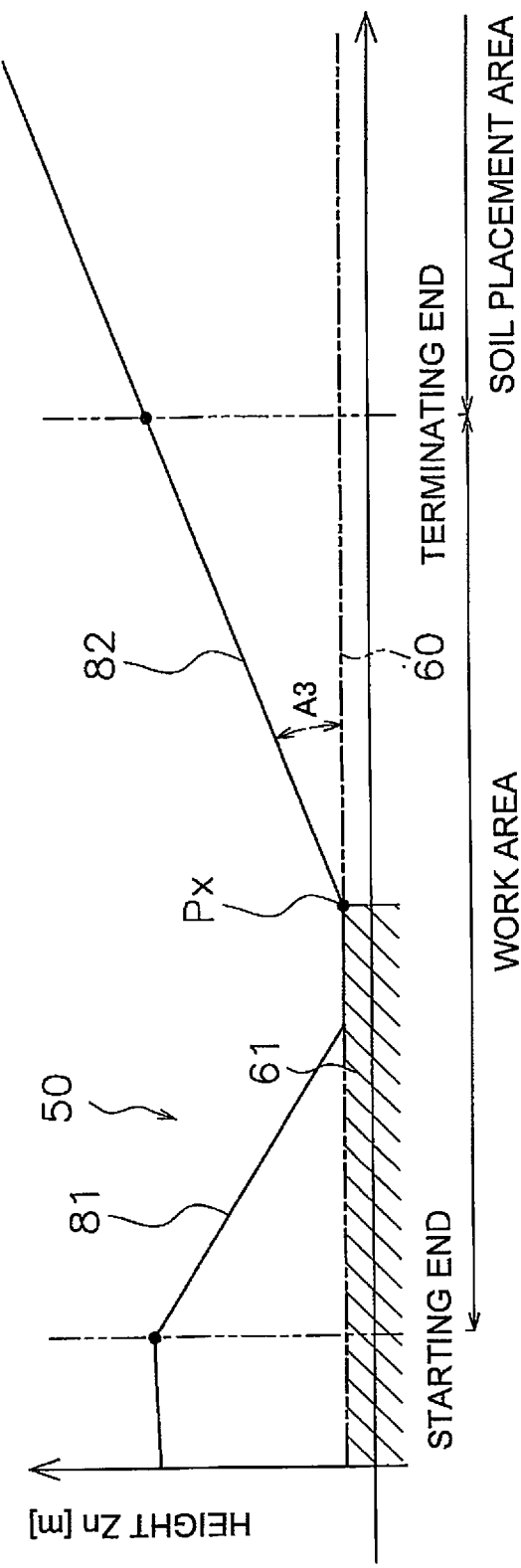
FIG. 11 is a diagram illustrating an example of the dug actual topography.

As illustrated in FIG. 11, in the case where an ore layer 61 is present closer to the starting end than an intersection Px of the final design topography 60 and the exit path 82 is, setting the exit path 82 as illustrated in FIG. 11 enables to discharge the soil in the soil placement area efficiently. Therefore, the controller 26 may determine the position of the exit path 82 by inclining the exit path 82 at the target inclination angle A3 from the intersection Px. The intersection Px corresponds to an end point of the ore layer 61. That is, the controller 26 may determine the exit path 82 so that the exit path 82 extends from the end point Px of the ore layer 61 in a direction inclined at the target inclination angle A3 with respect to the final design topography 60. The controller 26 may determine the exit path 82 so that the exit path 82 extends from a position ahead of the end point Px of the ore layer 61 in the traveling direction, that is, from a position outside the ore layer 61, as long as the exit path 82 does not extend over the ore layer 61. In other words, the controller 26 may determine the exit path 82 so that the exit path 82 extends from a position beyond the end point Px of the ore layer 61 in the traveling direction of the work vehicle 1.

In step S110, the controller 26 updates the work site topography data. The controller 26 updates the work site topography data based on position data indicating the latest trajectory of the blade tip position PB. The work site topography data may be updated as needed. Alternatively, the controller 26 may calculate the position of the bottom surface of the crawler belts 16 from the vehicle body position data and the vehicle body dimension data, and update the work site topography data according to the position data indicating the trajectory of the bottom surface of the crawler belts 16. In this case, the update of the work site topography data can be performed instantly.

Alternatively, the work site topography data may be generated from survey data measured by a survey device outside of the work vehicle 1. Aerial laser survey may be used as an external survey device, for example. Alternatively, the actual topography 50 may be imaged by a camera, and the work site topography data may be generated from the image data captured by the camera. For example, aerial photographic survey using an unmanned aerial vehicle (UAV) may be used. In the case of using the external survey device or the camera, the work site topography data may be updated at a predetermined interval or as needed.

In the control system 3 of the work vehicle 1 according to the present embodiment described above, the first target design topography 70 and the inclined second target design topography 80 are determined. Therefore, by digging the actual topography according to the second target design topography 80, the entry path 81 to the work position and the exit path 82 from the work position of the work vehicle 1 can be formed as illustrated in FIG. 11. As a result, a reduction in work efficiency can be prevented.

Although the embodiment of the present invention has been described so far, the present invention is not limited to the above embodiment and various modifications may be made within the scope of the invention.

The work vehicle 1 is not limited to the bulldozer, and may be another vehicle such as a wheel loader, a motor grader, or a hydraulic excavator.

The work vehicle 1 may be remotely operable. In this case, a portion of the control system 3 may be disposed outside of the work vehicle 1. For example, the controller 26 may be disposed outside of the work vehicle 1. The controller 26 may be disposed in a control center that is away from the work site. In this case, the work vehicle 1 may be a vehicle that does not include the operating cabin 14.

The work vehicle 1 may be a vehicle driven by an electric motor. In this case, a power supply may be displaced outside the work vehicle 1. The work vehicle 1 to which the power is supplied from the outside may be a vehicle without an internal combustion engine and an engine compartment.

Figure 12:
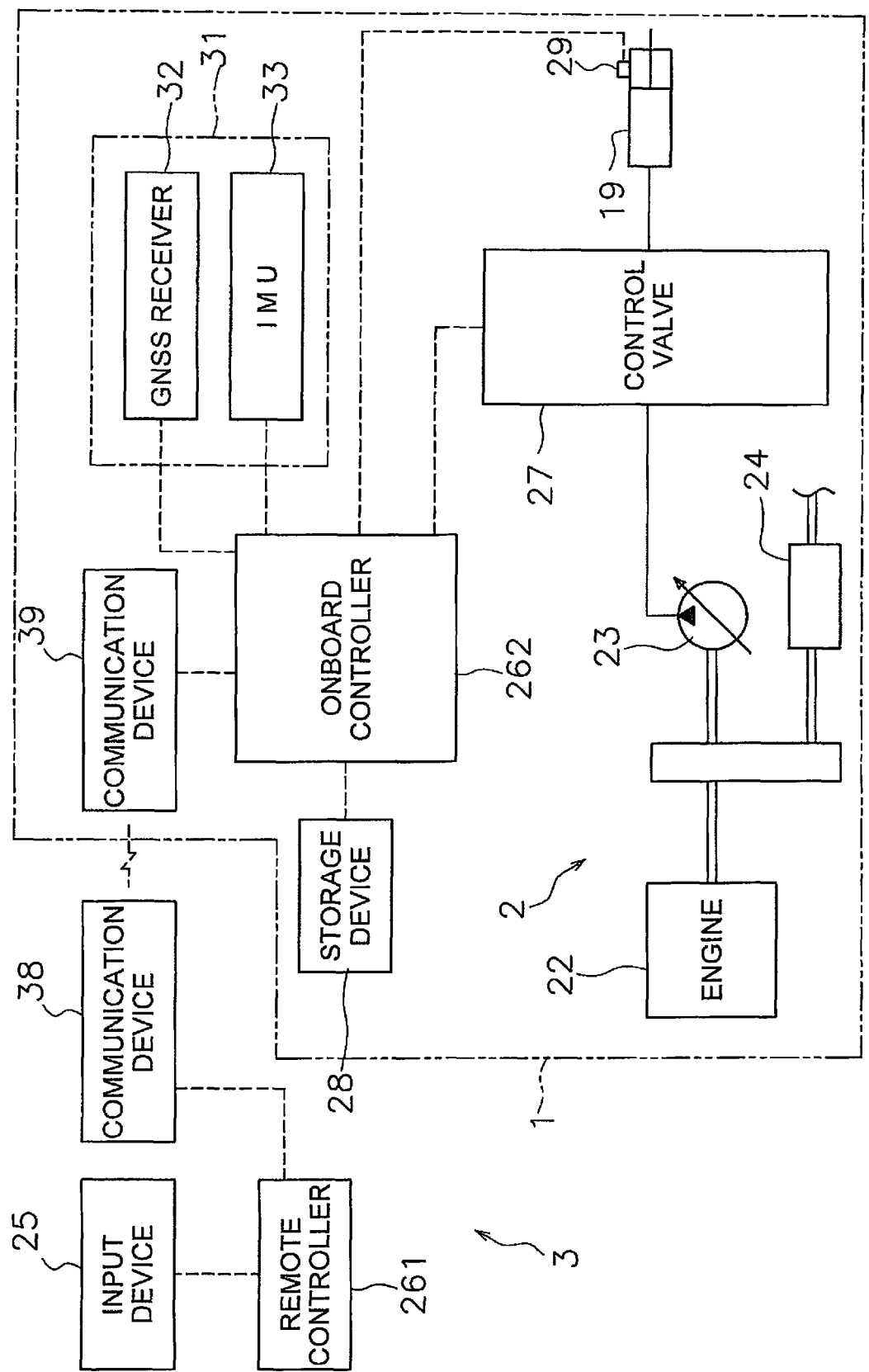
FIG. 12 is a block diagram of a configuration according to a first modified example of the control system.

The controller 26 may have a plurality of controllers 26 separated from one another. For example, as illustrated in FIG. 12, the controller 26 may include a remote controller 261 disposed outside of the work vehicle 1 and an onboard controller 262 mounted on the work vehicle 1. The remote controller 261 and the onboard controller 262 may be able to communicate wirelessly via communication devices 38 and 39. Some of the aforementioned functions of the controller 26 may be executed by the remote controller 261, and the remaining functions may be executed by the onboard controller 262. For example, the processing of determining the first target design topography 70 and the working order may be executed by the remote controller 261, and the processing of outputting a command signal to the work implement 13 may be executed by the onboard controller 262.

The input device 25 may be disposed outside the work vehicle 1. In this case, the operating cabin may be omitted from the work vehicle 1. Alternatively, the input device 25 may be omitted from the work vehicle 1. The input device 25 may include an operating element such as an operating lever, a pedal, or a switch for operating the travel device 12 and/or the work implement 13. The traveling back and forth of the work vehicle 1 may be controlled according to the operation of the input device 25. The movement such as raising and lowering of the work implement 13 may be controlled according to the operation of the input device 25.

Figure 13:
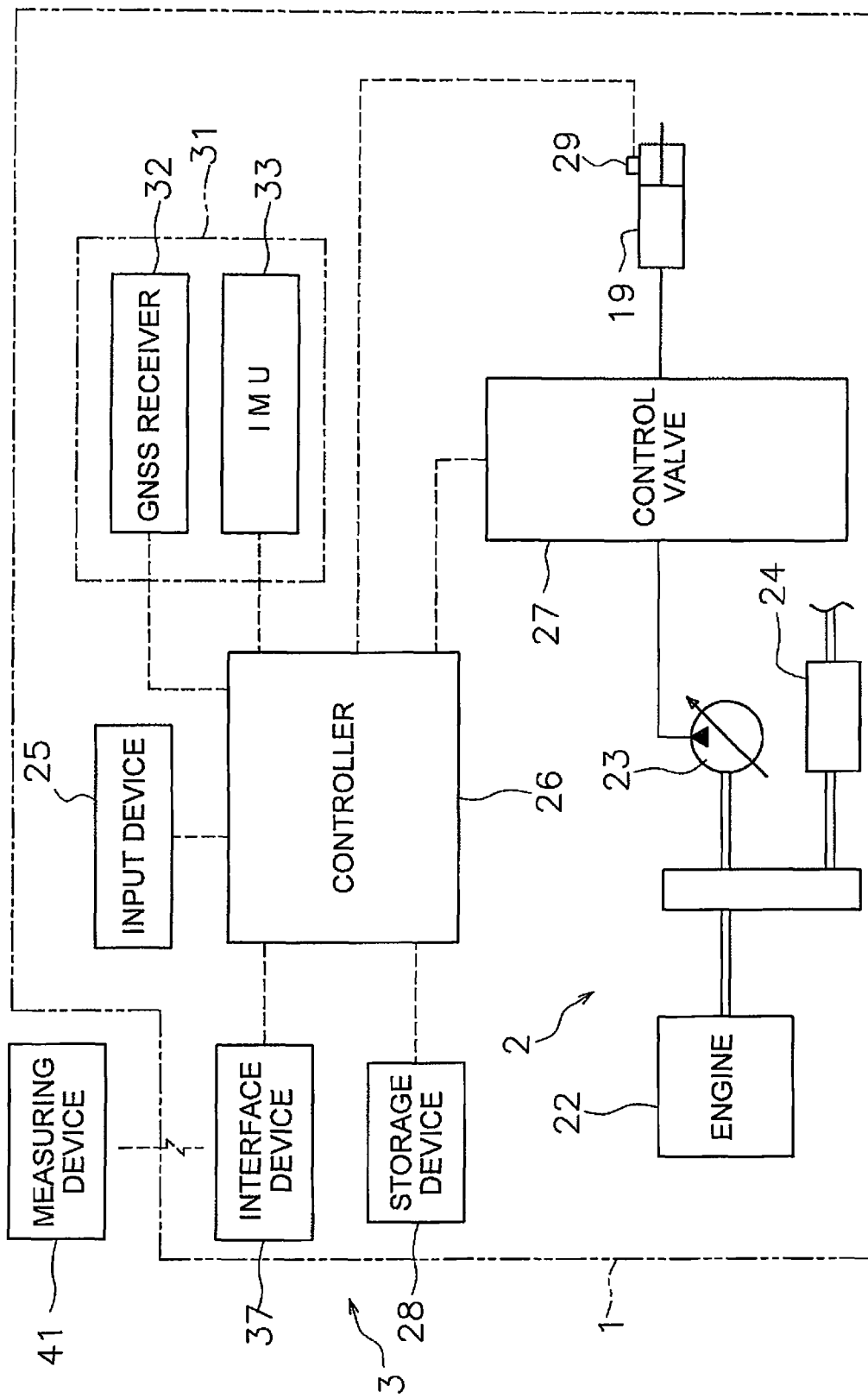
FIG. 13 is a block diagram of a configuration according to a second modified example of the control system.

The actual topography 50 may be acquired by another device, instead of the aforementioned position sensor 31. For example, as illustrated in FIG. 13, the actual topography 50 may be acquired by an interface device 37 that receives data from an external device. The interface device 37 may wirelessly receive the actual topography data measured by an external measuring device 41. Alternatively, the interface device 37 may be a recording medium reading device and may receive the actual topography data measured by the external measuring device 41.

Figure 14:
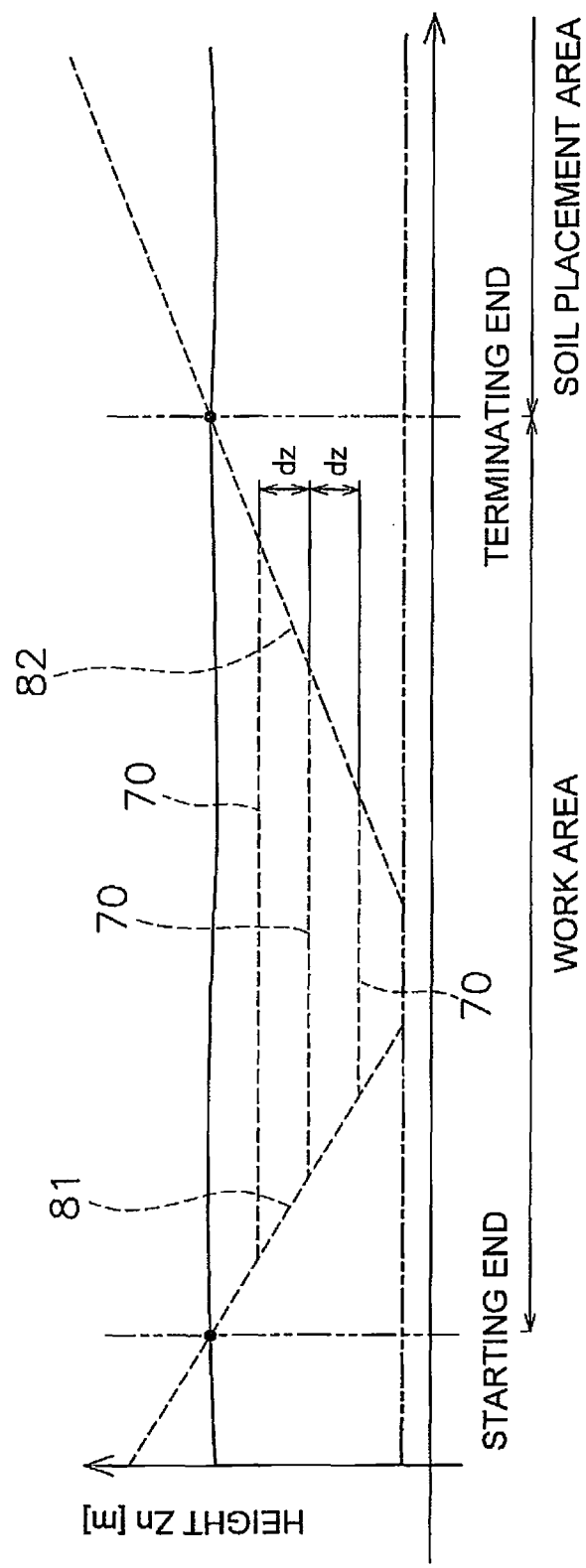
FIG. 14 is a diagram illustrating a modified example of the first target design topography.

The method for determining the first target design topography 70 is not limited to that of the above embodiment, and may be changed. For example, the first target design topography 70 may be a topography acquired by vertically displacing the actual topography 50 by a predetermined distance. Alternatively, as illustrated in FIG. 14, the first target design topography 70 may extend in the horizontal direction. Alternatively, the controller 26 may determine the final design topography 60 as the first target design topography 70.

In the above embodiment, the second target design topography 80 is inclined with respect to the horizontal direction. However, the second target design topography 80 may be inclined with respect to the first target design topography 70. In this case, the target inclination angle of the second target design topography 80 may be a target angle of the second target design topography 80 with respect to the first target design topography 70. Alternatively, the second target design topography 80 may be inclined with respect to the final design topography 60. In this case, the target inclination angle of the second target design topography 80 may be a target angle of the second target design topography 80 with respect to the final design topography 60. The second target design topography 80 may be set to be horizontal.

The controller 26 may determine only one of the entry path 81 and the exit path 82. The controller 26 may determine the entry path 81 so that the entry path 81 passes through a position other than the starting end. The controller 26 may determine the exit path 82 so that the exit path 82 passes through a position other than the terminating end.

According to the present invention, a reduction in work efficiency can be prevented under automatic control of the work vehicle.

The invention claimed is:

1. A control system for a work vehicle including a work implement, the control system comprising:
a controller configured to
determine a first target design topography at least partially positioned below an actual topography, the first target design topography being indicative of a target trajectory of the work implement,
determine a second target design topography at least partially positioned below an actual topography, the second target design topography being inclined with respect to the first target design topography, and the second target design topography being indicative of a target trajectory of the work implement, and
generate a command signal
to operate the work implement according to the first target design topography in an area where the first target design topography is positioned above the second target design topography and
to operate the work implement according to the second target design topography in an area where the second target design topography is positioned above the first target design topography.

2. The control system for the work vehicle according to claim 1, wherein
the controller is further configured to
determine a position of a cut based on the first target design topography and the second target design topography, and
generate a command signal to operate the work implement from a position of the cut according to the first target design topography and the second target design topography.

3. The control system for the work vehicle according to claim 1, wherein
the second target design topography includes
an exit path inclined forward and upward in a traveling direction of the work vehicle, or
an entry path inclined forward and downward in the traveling direction of the work vehicle, and
the first target design topography intersects the exit path or the entry path.

4. The control system for the work vehicle according to claim 1, wherein
the second target design topography includes an exit path, and
the controller is further configured to
acquire work area data indicative of a work area, and
determine the exit path so that the exit path passes through a terminating end of the work area.

5. The control system for the work vehicle according to claim 1, wherein
the second target design topography includes an exit path, and
the controller is further configured to acquire a final design topography and a position of an end point of an ore layer, and determine the exit path so that the exit path extends in a direction inclined at a predetermined angle with respect to the final design topography from the end point or outside of the end point.

6. The control system for the work vehicle according to claim 1, wherein the second target design topography includes
an entry path inclined forward and downward in a traveling direction of the work vehicle, and
an exit path positioned ahead of the entry path and inclined forward and upward in the traveling direction of the work vehicle, and
a target inclination angle of the entry path is larger than a target inclination angle of the exit path.

7. The control system for the work vehicle according to claim 1, wherein the controller is further configured to
determine a plurality of first target design topographies, and
determine the second target design topography so that the second target design topography intersects each of the plurality of first target design topographies.

8. The control system for the work vehicle according to claim 1, further comprising:

an input device that outputs an operation signal indicative of a target inclination angle of the second target design topography,
the controller being further configured to
receive the operation signal from the input device, and
determine the second target design topography so that an inclination angle of the second target design topography is the target inclination angle.

9. A method executed by a controller for controlling a work vehicle including a work implement, the method comprising:

determining a first target design topography at least partially positioned below an actual topography, the first target design topography being indicative of a target trajectory of the work implement;
determining a second target design topography at least partially positioned below an actual topography, the second target design topography being inclined with respect to the first target design topography, and the second target design topography being indicative of a target trajectory of the work implement; and
generating a command signal
to operate the work implement according to the first target design topography in an area where the first target design topography is positioned above the second target design topography and
to operate the work implement according to the second target design topography in an area where the second target design topography is positioned above the first target design topography.

10. The method according to claim 9, further comprising:

determining a position of a cut based on the first target design topography and the second target design topography,
the generating the command signal including generating a command signal to operate the work implement from a position of the cut according to the first target design topography and the second target design topography.

11. The method according to claim 9, wherein the second target design topography includes an exit path inclined forward and upward in a traveling direction of the work vehicle, or an entry path inclined forward and downward in the traveling direction of the work vehicle.

12. The method according to claim 9, wherein the second target design topography includes an exit path, and
the method further comprising:
acquiring work area data indicative of a work area, and
determining the exit path so that the exit path passes through a terminating end of the work area.

13. The method according to claim 9, wherein the second target design topography includes an exit path, and
the method further comprising:
acquiring a final design topography and a position of an end point of an ore layer, and
determining the exit path so that the exit path extends in a direction inclined at a predetermined angle with respect to the final design topography from the end point or outside of the end point.

14. The method according to claim 9, wherein the second target design topography includes
an entry path inclined forward and downward in a traveling direction of the work vehicle, and
an exit path positioned ahead of the entry path and inclined forward and upward in the traveling direction of the work vehicle, and
a target inclination angle of the entry path is larger than a target inclination angle of the exit path.

15. The method according to claim 9, wherein a plurality of first target design topographies are determined, and
the second target design topography is determined so as to intersect each of the plurality of first target design topographies.

16. The method according to claim 9, further comprising:

receiving an operation signal indicative of a target inclination angle of the second target design topography; and
determining the second target design topography so that an inclination angle of the second target design topography is the target inclination angle.

17. A control system for a work vehicle including a work implement, the control system comprising:

a controller configured to
determine a first target design topography at least partially positioned below an actual topography, the first target design topography being indicative of a target trajectory of the work implement,
determine an exit path at least partially positioned below the actual topography, the exit path being inclined with respect to the first target design topography, and the exit path being indicative of a target trajectory of the work implement, and
generate a command signal
to operate the work implement along the exit path in a region positioned below the actual topography and
to operate the work implement along the exit path in a region positioned above the actual topography.

18. The control system for the work vehicle according to claim 17, wherein the controller is further configured to
determine a path of a cut based on the first target design topography and the exit path, and
generate a command signal to operate the work implement along the path.

19. The control system for the work vehicle according to claim 17, wherein
the controller is further configured to
acquire a final design topography and a position of an end point of an ore layer, and
determine the exit path so that the exit path extends in a direction inclined at a predetermined angle with respect to the final design topography from the end point or outside of the end point.

20. The control system for the work vehicle according to claim 17, further comprising:
an input device that outputs an operation signal indicative of a target inclination angle of the exit path,
the controller being further configured to
receive the operation signal from the input device, and
determine the exit path so that an inclination angle of the exit path is the target inclination angle.

\* \* \* \* \*